"(12) United States Patent
Makino

(10) Patent No.: US 11,994,493 B2
(45) Date of Patent: *May 28, 2024

(54) METHOD FOR NONDESTRUCTIVE ASSESSMENT OF STEEL

(71) Applicant: SINTOKOGIO, LTD., Nagoya (JP)

(72) Inventor: Yoshiyasu Makino, Toyokawa (JP)

(73) Assignee: SINTOKOGIO, LTD., Aichi (JP)

( * ) Notice: Subject to any disclaimer, the term of this patent is extended or adjusted under 35 U.S.C. 154(b) by 190 days.

This patent is subject to a terminal disclaimer.

(21) Appl. No.: 17/434,866

(22) PCT Filed: Jan. 17, 2020

(86) PCT No.: PCT/JP2020/001548
§ 371 (c)(1),
(2) Date: Aug. 30, 2021

(87) PCT Pub. No.: WO2020/183908
PCT Pub. Date: Sep. 17, 2020

(65) Prior Publication Data
US 2022/0163483 A1 May 26, 2022

(30) Foreign Application Priority Data
Mar. 8, 2019 (JP) ................. 2019-042972

(51) Int. Cl.
G01N 27/90 (2021.01)
G01N 27/80 (2006.01)
(52) U.S. Cl.
CPC ........ G01N 27/9006 (2013.01); G01N 27/80 (2013.01); G01N 27/9046 (2013.01)
(58) Field of Classification Search
CPC ............... G01N 27/80–82; G01N 27/90–9093
(Continued)

(56) References Cited

U.S. PATENT DOCUMENTS 4,528,856 A 7/1985 Junker et al.
2008/0001609 A1 1/2008 Kojima et al.
(Continued)

FOREIGN PATENT DOCUMENTS

CN 108267502 7/2018
EP 0618445 A2 10/1994
(Continued)

OTHER PUBLICATIONS

Makino; Translation of WO 2017/081879 A1; May 18, 2017; Translated by Google & EPO (Year: 2017).*
(Continued)

Primary Examiner — Alesa Allgood
Assistant Examiner — Rahul Maini
(74) Attorney, Agent, or Firm — Harness, Dickey & Pierce, P.L.C.

(57) ABSTRACT

A method identifies a cause of change in magnetic permeability of an object under inspection and evaluates the state of surface treatment(s) of the object under inspection with high accuracy. An embodiment of the method includes preparing a non-destructive inspection apparatus; placing the object under inspection; generating eddy current in the object under inspection; continuously changing the penetration depth of an AC magnetic field in the object under inspection; calculating the value of impedance at each penetration depth in the object under inspection; and evaluating the state of the surface treatment(s) by: calculating the ratio between the value of impedance at each penetration depth in the object under inspection and the value of impedance at a corresponding penetration depth in steel which has not been subjected to a surface treatment; and identifying a cause of a change in magnetic permeability of the object under inspection based upon the calculated ratio.

7 Claims, 12 Drawing Sheets

(58) Field of Classification Search
USPC .................. 324/228–232, 234, 236–243
See application file for complete search history.

(56) References Cited

U.S. PATENT DOCUMENTS

| | | |
|---|---|---|
| 2014/0084910 A1 | 3/2014 | Makino |
| 2015/0083918 A1 | 3/2015 | Emmenegger et al. |
| 2018/0188209 A1 | 7/2018 | Makino |
| 2018/0299393 A1 | 10/2018 | Makino |

FOREIGN PATENT DOCUMENTS

| | | |
|---|---|---|
| EP | 2707705 A1 | 3/2014 |
| JP | 05-203503 A | 8/1993 |
| JP | 07-092140 A | 4/1995 |
| JP | 2001-82911 | 3/2001 |
| JP | 2007/040865 A | 2/2007 |
| JP | 2008-002973 | 1/2008 |
| JP | 2010-25746 | 2/2010 |
| JP | 2011/185623 A | 9/2011 |
| WO | WO-2012/153862 A1 | 11/2012 |
| WO | WO2016/208382 | 12/2016 |
| WO | WO2017/081879 | 5/2017 |
| WO | WO2019/012991 | 1/2019 |

OTHER PUBLICATIONS

International Search Report dated Mar. 31, 2020.
International Preliminary Report on Patentability dated Sep. 23, 2021.
Anonymous, "Eddy current—Wikipedia, the 4 free encyclopedia", Jul. 14, 2014, Retrieved from the Internet at URL: <https://web.archive.org/web/20140714030558/https://en.wikipedia.org/wiki/Eddy_current> retrieved on Nov. 8, 2018, 10 pages.
Extended European Search Report for European Application No. 16863843.5 dated Nov. 22, 2018.
International Search Report in corresponding International Application No. PCT/JP2016/066922 dated Aug. 16, 2016.
U.S. Office Action for U.S. Appl. No. 15/737,981 dated Sep. 9, 2019.
U.S. Final Office Action for U.S. Appl. No. 15/737,981 dated Jan. 30, 2020.

* cited by examiner

METHOD FOR NONDESTRUCTIVE ASSESSMENT OF STEEL

CROSS-REFERENCE TO RELATED APPLICATIONS

This application is a national phase under 35 U.S.C. § 371 of PCT International Application No. PCT/JP2020/001548 which has an International filing date of Jan. 17, 2020, which claims priority to Japanese Application No. 2019-042972, filed Mar. 8, 2019, the entire contents of each of which are hereby incorporated by reference.

TECHNICAL FIELD

The present invention relates to a method for non-destructive inspection of steel.

BACKGROUND ART

For the process of producing steel, various non-destructive inspection methods have conventionally been proposed in which steel having been subjected to a surface treatment such as shot peening or a heat treatment is an object under inspection and in which whether the surface treatment has been carried out normally or not is measured without destroying the object under inspection.

For example, there is a non-destructive inspection method in which alternating current is passed through a coil disposed on the surface of steel which is an object under inspection, the impedance of the coil is measured, and thereby the residual stress distribution in the object under inspection which has been subjected to a shot peening treatment is measured (see Patent Literature 1). This non-destructive inspection method involves evaluating the object under inspection by: pre-acquiring data relating to the impedances of a plurality of samples (pieces of steel having been subjected to a shot peening treatment) in which residual stress in different states is generated; and comparing the acquired data and data relating to the impedance of the object under inspection.

CITATION LIST

Patent Literature

[Patent Literature 1]
Japanese Patent Application Publication, Tokukai, No. 2008-002973

SUMMARY OF INVENTION

Technical Problem

However, although the above non-destructive inspection method is capable of measuring the state of residual stress generated in steel having been subjected to a shot peening treatment, the above non-destructive inspection method is not capable of determining whether, for example, the carbon content of the steel having been subjected to a shot peening treatment is normal or not. Therefore, for example, in a case where a shot peening step was carried out after a carburizing and quenching step, it is not possible to determine whether a defect occurred in the carburizing and quenching step or in the shot peening step. As such, the foregoing non-destructive inspection method has an issue in that, even if the steel (object under inspection) is determined to be a defective material, it is not possible to determine in which step the defect occurred; therefore, the foregoing non-destructive inspection method has room for improvement in accuracy of evaluation of the surface condition of the object under inspection.

An aspect of the present invention was made in view of the above issue, and an object thereof is to provide a method for non-destructive inspection of steel which is capable of evaluating, with high accuracy, the surface condition of an object under inspection.

Solution to Problem

A method for non-destructive inspection of steel in accordance with an aspect of the present invention, which was made in order to attain the above object, includes a preparation step, a placing step, an eddy current generating step, a frequency changing step, an impedance calculating step, and an evaluation step.

The preparation step involves preparing a non-destructive inspection apparatus which includes a variable frequency circuit and a coil. The variable frequency circuit is capable of changing the frequency of alternating current. The coil is capable of inducing an AC magnetic field in response to alternating current.

The placing step involves placing an object under inspection so that the AC magnetic field induced by the coil penetrates into the object under inspection. The object under inspection is steel which has been subjected to one or more surface treatments.

The eddy current generating step involves generating eddy current in the object under inspection by allowing the AC magnetic field to penetrate into the object under inspection.

The frequency changing step involves continuously changing the penetration depth of the AC magnetic field in the object under inspection by causing the variable frequency circuit to continuously change the frequency of the alternating current from a low frequency to a high frequency.

The impedance calculating step involves calculating the value of impedance at each penetration depth in the object under inspection on the basis of the potential difference between opposite ends of the coil and the value of electric current passing through the coil.

Then, the evaluation step involves evaluating the state of the one or more surface treatments of the object under inspection by (a) calculating the ratio between the value of impedance at each penetration depth in the object under inspection calculated in the impedance calculating step and the value of impedance at a corresponding penetration depth in steel which has not been subjected to the one or more surface treatments and (b) identifying one or more causes of a change in magnetic permeability of the object under inspection on the basis of the ratio thus calculated. The one or more causes of the change in magnetic permeability include, for example, the carbon content or nitrogen content of the object under inspection, the size and shape of the object under inspection, the hardness of the object under inspection, and the like.

Advantageous Effects of Invention

A method for non-destructive inspection of steel in accordance with the present invention makes it possible to evaluate, with high accuracy, the state of surface treatment(s) of an object under inspection by identifying a cause of a change in magnetic permeability of the object under inspection.

Figure 7:
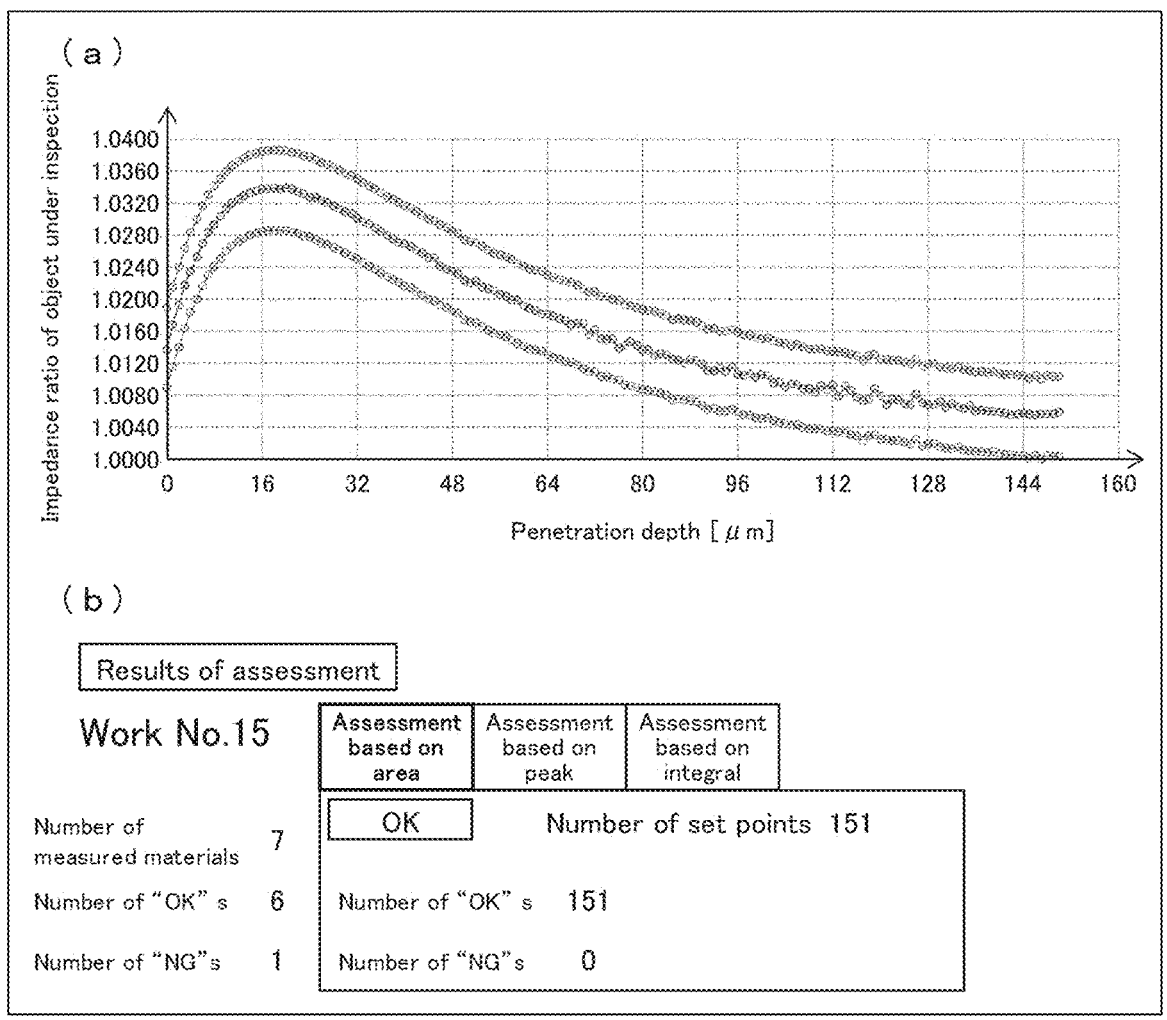

(a) of FIG. 7 is a chart showing examples of the result of impedance ratio calculation in the evaluation step in accordance with Embodiment 1. (b) of FIG. 7 illustrates an example of content displayed on a display device in a notifying step in accordance with Embodiment 1.

Figure 8:
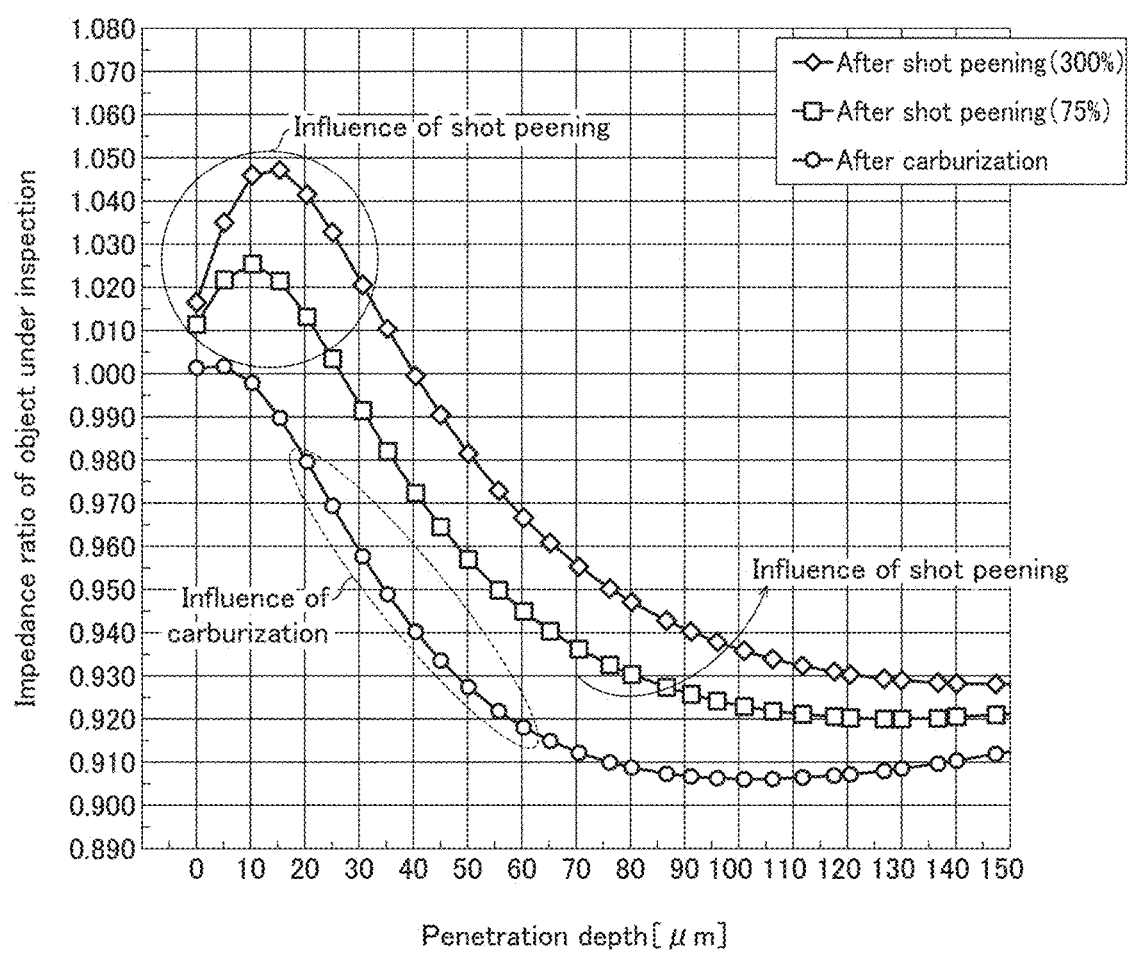

FIG. 8 is a chart showing the manner in which the magnetic permeability of steel having been subjected to a surface treatment in accordance with Embodiment 1 changes.

Figure 9:
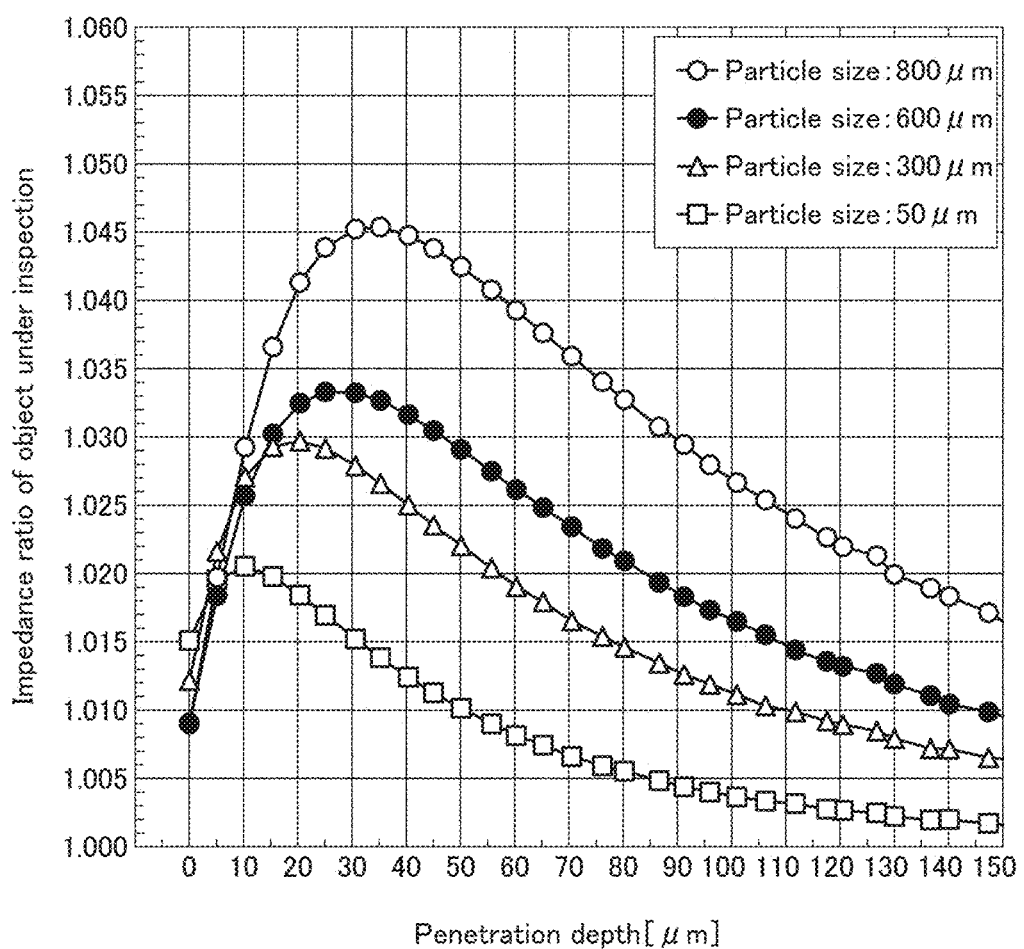

FIG. 9 is a chart showing examples of the result of impedance ratio calculation in accordance with Variation 1 of Embodiment 1.

Figure 10:
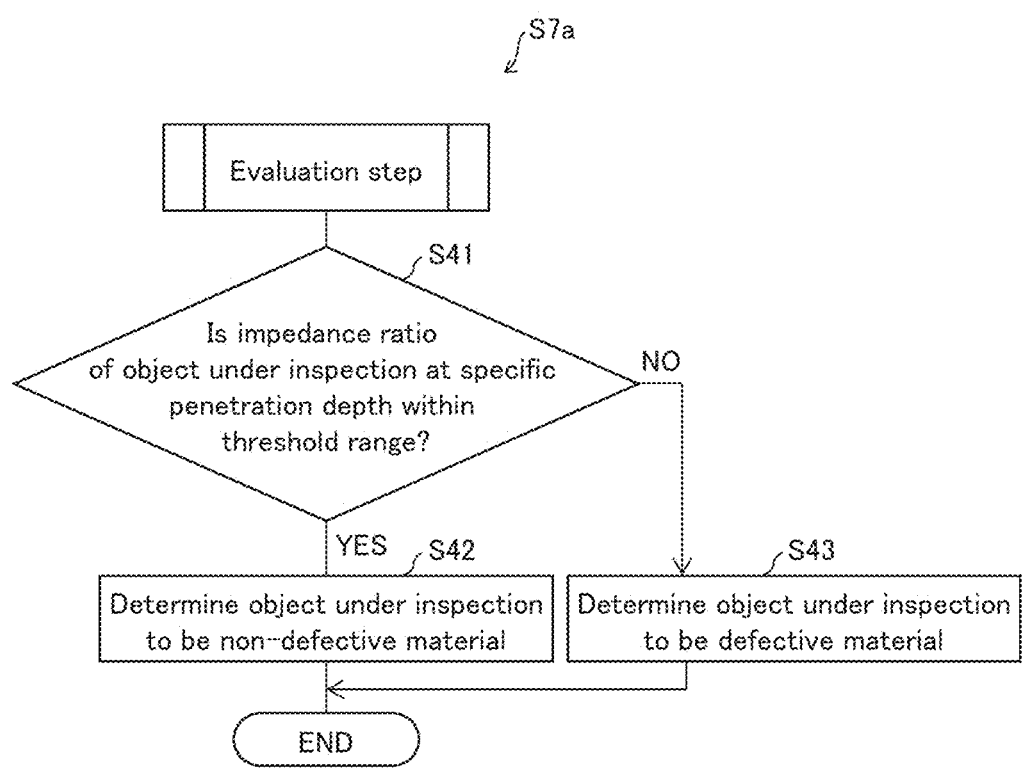

FIG. 10 is a flowchart illustrating a flow of an evaluation step in accordance with Embodiment 2 of the present invention.

Figure 11:
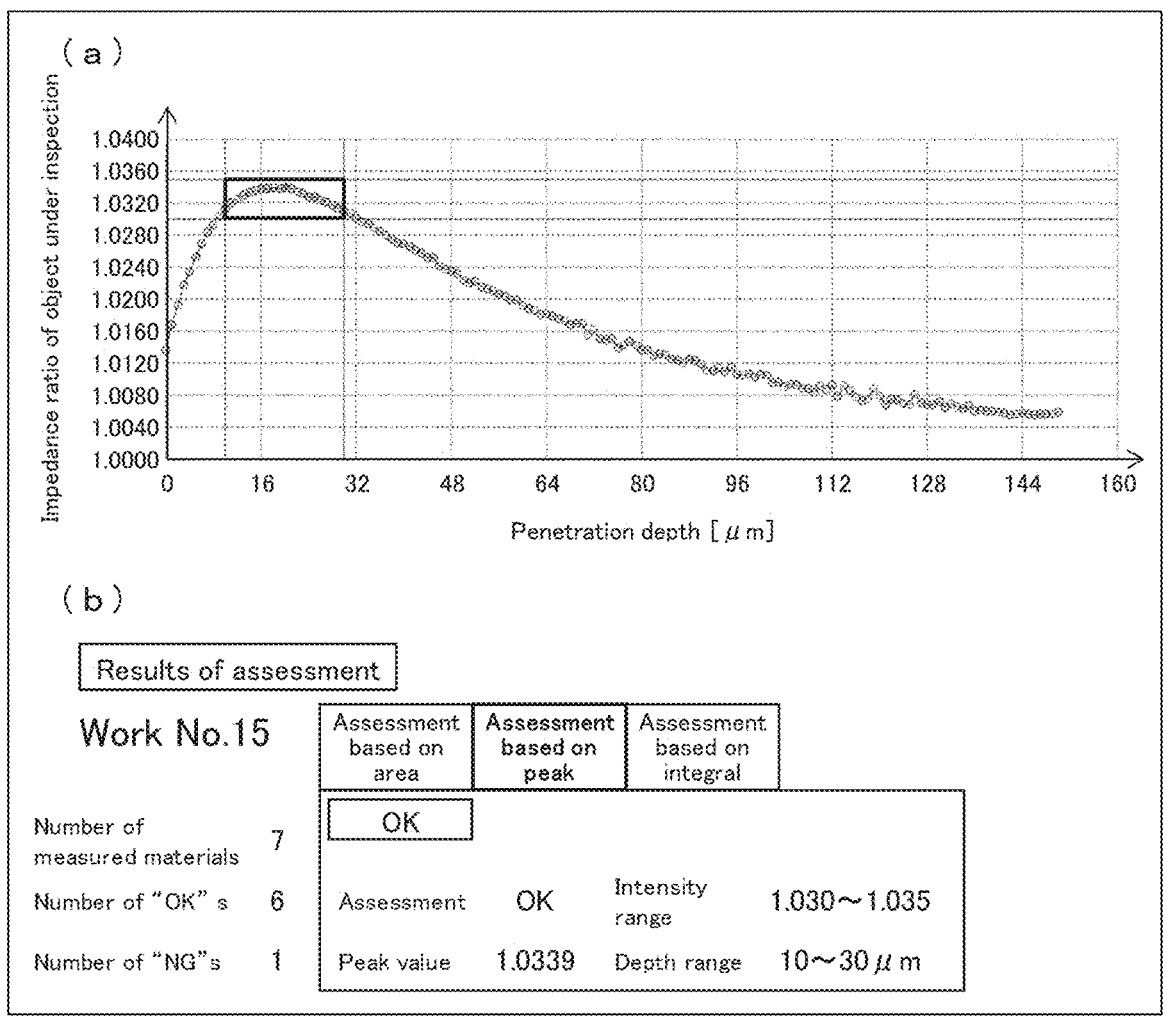

(a) of FIG. 11 is a chart showing examples of the result of impedance ratio calculation in the evaluation step in accordance with Embodiment 2. (b) of FIG. 11 illustrates an example of content displayed on a display device in a notifying step in accordance with Embodiment 2.

Figure 12:
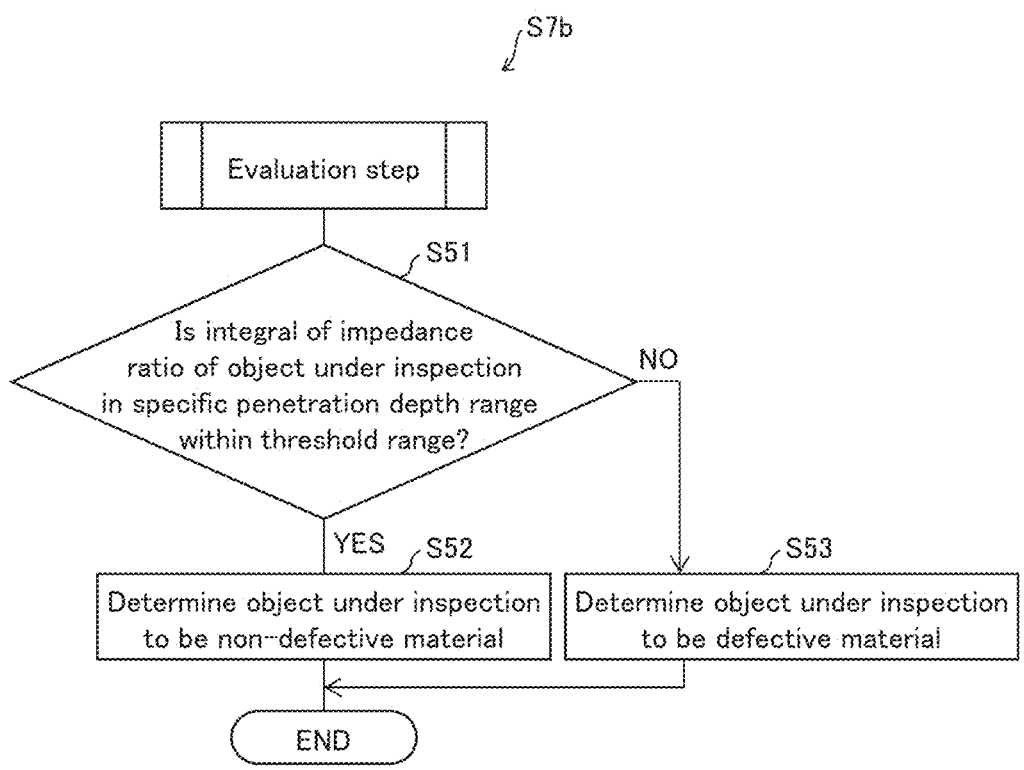

FIG. 12 is a flowchart illustrating a flow of an evaluation step in accordance with Embodiment 3 of the present invention.

Figure 13:
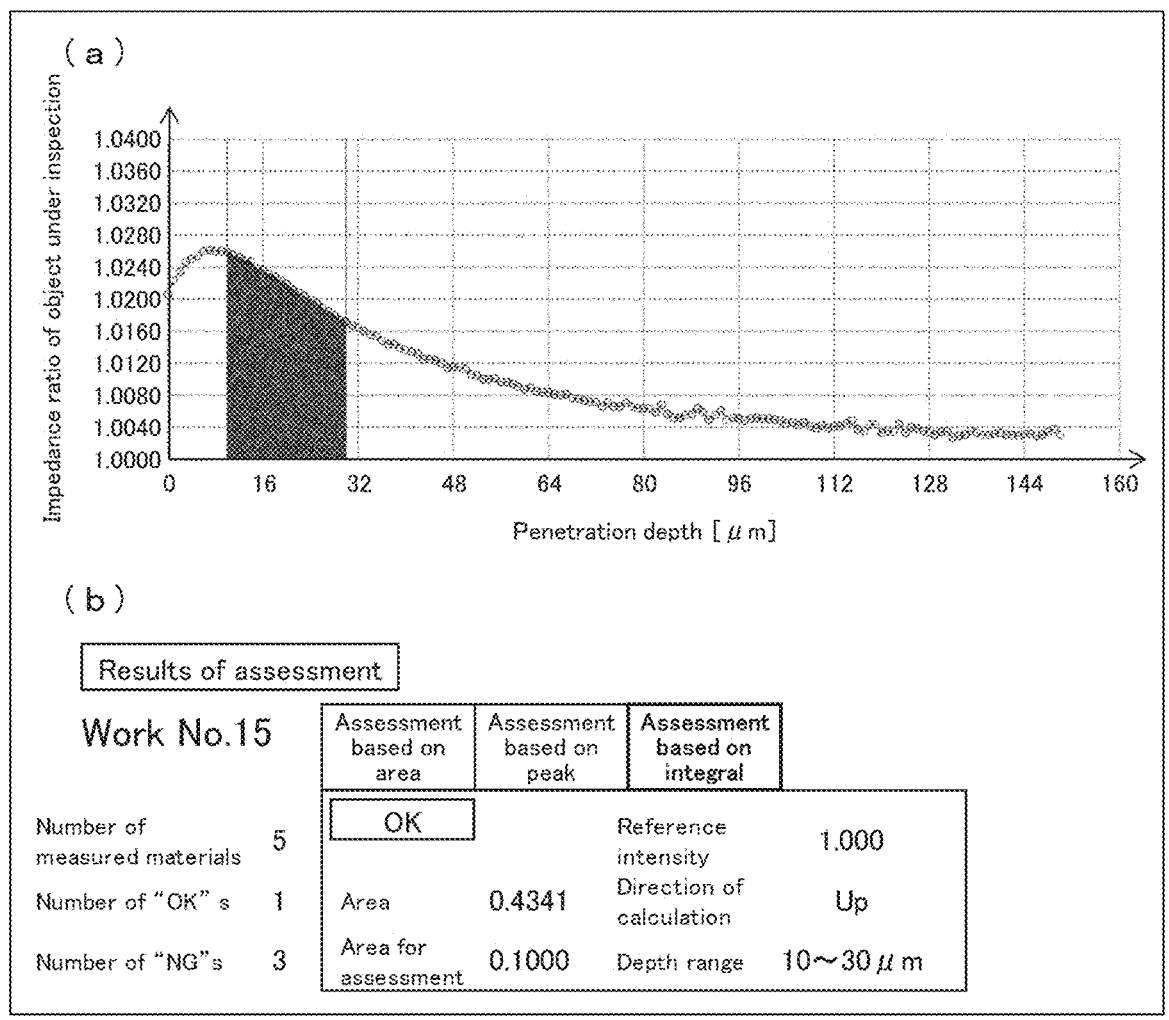

(a) of FIG. 13 is a chart showing examples of the result of impedance ratio calculation in the evaluation step in accordance with Embodiment 3. (b) of FIG. 13 illustrates an example of content displayed on a display device in a notifying step in accordance with Embodiment 3.

DESCRIPTION OF EMBODIMENTS

Embodiment 1

The following description will discuss a non-destructive inspection method in accordance with Embodiment 1 of the present invention with reference to FIGS. 1 to 9.

[Non-Destructive Inspection Apparatus]

Figure 1:
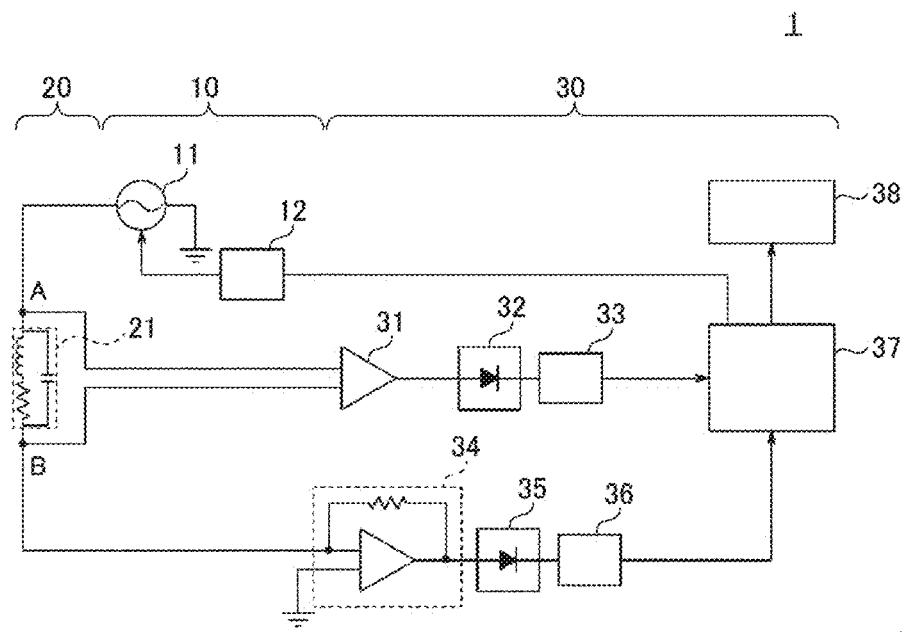
FIG. 1 is a circuit diagram of a non-destructive inspection apparatus in accordance with Embodiment 1 of the present invention.

As illustrated in FIG. 1, a non-destructive inspection apparatus 1 in accordance with Embodiment includes an oscillator 10, a detector 20, and a measurement instrument 30. The oscillator 10 includes an alternating current source 11 and a variable frequency circuit 12. The variable frequency circuit 12 is connected to the alternating current source 11, and changes the frequency of alternating current outputted from the alternating current source 11.

The detector 20 includes a coil 21 (described later). An end (point A in FIG. 1) of the coil 21 is connected to the alternating current source 11, and is supplied with alternating current outputted from the alternating current source 11. The other end (point B in FIG. 1) of the coil 21 is connected to an I/V conversion circuit 34 (described later). The detector 20 is used to carry out evaluation (which is a quality assessment in Embodiment 1) of an object under inspection M (described later) (see FIG. 3). Note that the circuit symbol enclosed by dashed line in FIG. 1, indicating the coil 21, represents the electrical equivalent circuit of the coil 21.

Figure 2:
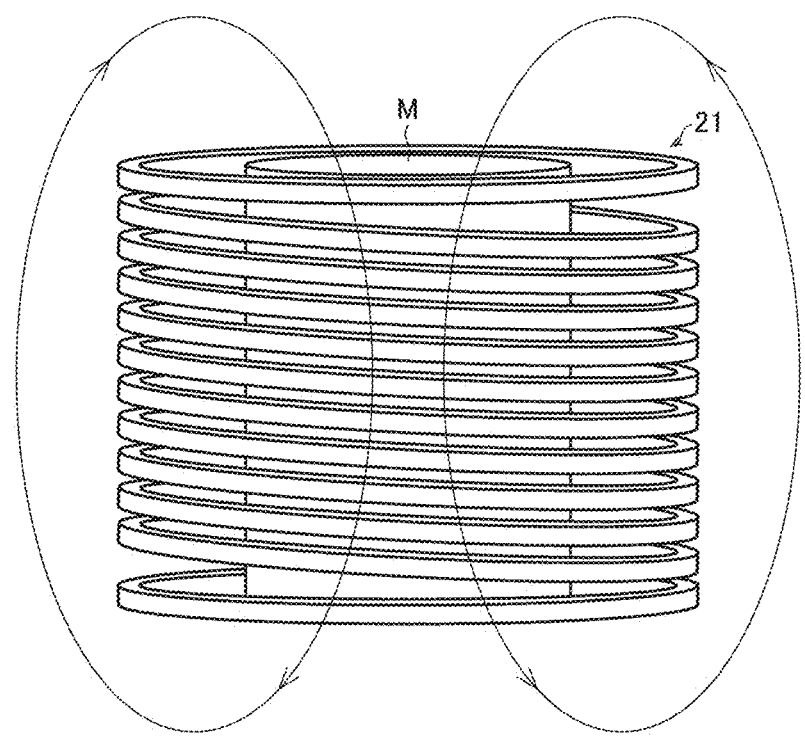
FIG. 2 schematically illustrates an AC magnetic field generated in a coil in accordance with Embodiment 1.

As illustrated in FIG. 2, the coil 21 consists of a plurality of conducting wire rods wound into a cylinder. In Embodiment 1, use of a bundle of thin conducting wires, which is like a single wire, as a wire rod makes it possible to raise the resonant frequency of the coil 21. Note that the coil 21 may be one obtained by winding a wire rod around a hollow cylindrical core (cored coil). The wire rod may be a single conducting wire.

The coil 21 of Embodiment 1 was prepared by the following method: first, a wire rod, obtained by interlacing and twisting several hundreds of enameled copper wires, was wound around a resin cylinder, then the wound wire rod was bonded with epoxy resin, and the cylinder was removed.

Note that the coil 21 can also be produced by some other method such as a method by which a wire rod covered with a thermosetting resin is coiled and then dried with hot air or in a drying furnace etc. to fix the wire rod so as to maintain the shape of the rod. The method of producing the coil 21 is not particularly limited, provided that the wire rod maintains the shape of the coil as such.

The measurement instrument 30 includes an amplifier circuit 31, an absolute value circuit 32, a low-pass filter (LPF) 33, an I/V conversion circuit 34, an absolute value circuit 35, an LPF 36, a control section 37, and a display device 38. The measurement instrument 30 serves to measure changes in the value of impedance of the coil 21 on the basis of a signal indicating electrical properties of alternating current passing through the coil 21.

The amplifier circuit 31 has one end (the left end in FIG. 1) connected to the opposite ends (points A and B in FIG. 1) of the coil 21, and has the other end (the right end in FIG. 1) connected to the absolute value circuit 32. To the amplifier circuit 31, a signal indicating the potential difference between the opposite ends of the coil 21 is inputted. The signal inputted into the amplifier circuit 31 is amplified and inputted into the absolute value circuit 32.

The absolute value circuit 32 is a full-wave rectifier circuit. The potential difference signal inputted into the absolute value circuit 32 is full-wave rectified and then converted into direct current by the LPF 33. The potential difference signal converted by the LPF 33 is inputted into the control section 37.

The I/V conversion circuit 34 is connected to the other end (point B in FIG. 1) of the coil 21. A signal indicating the value of electric current passed through the coli 21 is inputted into the I/V conversion circuit 34, and converted into a signal indicating potential difference. Then, the signal indicating the potential difference is full-wave rectified by the absolute value circuit 35, and then converted into direct current by the LPF 36. The signal converted by the LPF 36 is inputted into the control section 37.

The control section 37 includes a microprocessor, an interface circuit, a memory, programs for causing these members to operate, and the like (which are not illustrated). The control section 37 is connected to the variable frequency circuit 12, the LPF 33, and the LPF 36. To the control section 37, the following signals indicating the electrical properties of the coil 21 are inputted: a signal indicating the frequency of alternating current passing through the coil 21; a signal indicating the value of electric current corresponding to the frequency; and a signal indicating the potential difference. The control section 37 calculates the value of impedance at each frequency on the basis of the signals indicating the electrical properties of the coil 21.

Furthermore, the control section 37 has the function of outputting, to the variable frequency circuit 12, a signal that changes frequency automatically and continuously. In Embodiment 1, the frequency is changed via the variable frequency circuit 12 in response to control output from the control section 37 under the conditions in which steel (object under inspection M) is disposed within the coil 21 (see FIG. 2). Note that the frequency of the alternating current may be changed manually.

Furthermore, the control section 37 calculates a value $Z_2$ of the impedance at each frequency as the frequency continuously changes, and calculates an impedance ratio $\gamma_2$ ($Z_2/Z_0$), i.e., the ratio between the calculated value $Z_2$ of the impedance and a value $Z_0$ of the impedance of steel which has not been subjected to a predetermined surface treatment (such steel is "reference material"). Furthermore, the control section calculates an impedance ratio $\gamma_1$ ($Z_1/Z_0$), i.e., the ratio between a value $Z_1$ of impedance at each penetration depth in a case of a non-defective material and the impedance $Z_0$ of the steel which has not been subjected to the surface treatment. Then, the control section 37 compares the impedance ratio $\gamma_2$ of the object under inspection M and the impedance ratio $\gamma_1$ of the non-defective material, thereby carrying out a quality assessment of the surface condition of the object under inspection M.

The display device 38 is a device to display, in a notifying step (S8) (described later), the results of evaluation (results of quality assessment) carried out by the control section 37, as illustrated in (b) of FIG. 7. As illustrated in (a) of FIG. 7, the display device 38 not only displays the results of the quality assessment on the object under inspection M but also displays a chart showing the relationship between the impedance ratio $\gamma_2$ of the object under inspection M and penetration depth.

[Method for Controlling Eddy Current]

The following description will discuss a method for controlling eddy current in the non-destructive inspection apparatus 1. First, alternating current is applied to the coil 21 of the non-destructive inspection apparatus 1 from the alternating current source 11. Once the alternating current has been applied to the coil 21, an AC magnetic field induced by the coil 21 penetrates into the object under inspection M disposed within the coil 21 (describe later) (see FIG. 2). This generates eddy current in the object under inspection M.

With the non-destructive inspection apparatus 1 in accordance with Embodiment 1, the control section 37 outputs a control signal to the variable frequency circuit 12, thereby making it possible to continuously change the frequency of alternating current from a low frequency to a high frequency. Since the variable frequency circuit 12 continuously changes the frequency of alternating current, it is possible to continuously change the penetration depth of the AC magnetic field in the object under inspection M. Specifically, the frequency of alternating current is, for example, changed from a frequency as low as about 10 kHz to a frequency as high as about 20 MHz. With this, the penetration depth of the AC magnetic field in the object under inspection M is changed from 0 μm to 150 μm.

It is noted here that there is a relationship represented by the following equation (1) between the penetration depth of the AC magnetic field in the object under inspection M and the frequency of alternating current. In Embodiment 1, the penetration depth of the AC magnetic field in the object under inspection M is determined from the frequency of alternating current using the relational equation (1).

$$\delta = \frac{1}{\sqrt{\pi f \sigma \mu}} \quad (1)$$

In the equation (1), δ represents penetration depth [m], f represents the frequency of alternating current [Hz], σ represents the electrical conductivity [S/m] of the object under inspection M, and p represents the magnetic permeability [H/m] of the object under inspection M.

The control section 37 calculates the value of impedance at each penetration depth in the object under inspection M by: continuously changing the penetration depth of the AC magnetic field in the object under inspection M; and calculating the ratio between the potential difference between the opposite ends of the coil 21 and the value of electric current passing through the coil 21. This value of impedance changes with, for example, changes in the magnetic permeability of steel having been subjected to a surface treatment.

The magnetic permeability of the object under inspection M changes in relation to various parameters such as the carbon content or nitrogen content of the object under inspection M, the magnitude and direction of elastic strain in the object under inspection M, the magnitude of plastic strain in the object under inspection M, arrangement of atoms (phase transformation) in the object under inspection M, size and shape of the object under inspection M, and hardness of the object under inspection M. In a method for non-destructive inspection of steel in accordance with Embodiment 1, the relationship between the above parameters and the magnetic permeability is used to carry out various evaluations on the object under inspection M which is steel having been subjected to a surface treatment (see FIG. 3).

[Production Process]

Figure 4:
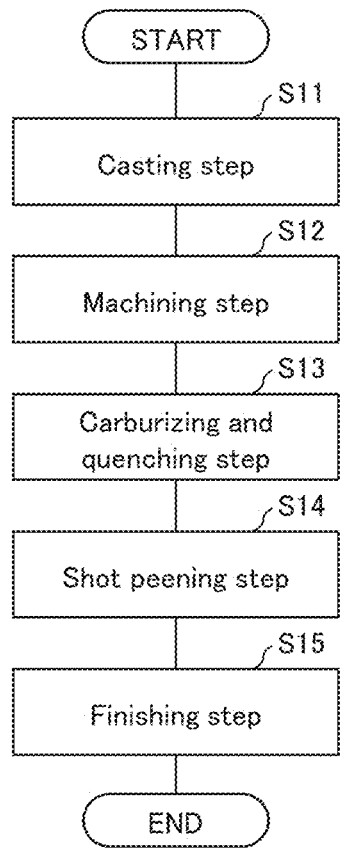
FIG. 4 is a flowchart illustrating a flow of a production process in accordance with Embodiment 1.

The following description will discuss a flow of a process of producing steel in accordance with Embodiment 1, with reference to the flowchart shown in FIG. 4. Note that the flowchart shown in FIG. 4 is an example, and does not imply any limitation.

In the process for producing steel in accordance with Embodiment 1, first, a casting step (S11) is carried out, and thereafter a machining step (S12) such as cutting and processing is carried out. In this machining step (S12), for example, the steel is cut and processed into a desired shape (cylindrical shape, gear shape, or the like). Note that the type of machining can be changed as appropriate.

Next, a carburizing and quenching step (S13) is carried out. In this carburizing and quenching step (S13), steel is subjected to a carburizing and quenching treatment, and thereby the amount of carbon in the surface of the steel increases and the magnetic permeability of the steel decreases. Note that the amount of carbon is merely an example of a cause of a change in magnetic permeability, and the magnetic permeability of the object under inspection M changes with the foregoing plurality of parameters.

After the carburizing and quenching step (S13), a shot peening step (S14) is carried out. In this shot peening step (S14), a shot peening apparatus (not illustrated) is used to project a shot material in the form of small spheres to the surface of the steel, thereby giving a modification to the surface of the steel. After this shot peening, the magnetic permeability of the surface of the steel has been increased as compared to that before the shot peening.

Next, a finishing step (S15) is carried out. In this finishing step (S15), the steel is subjected to finishing such as, for example, brushing, buffing, and/or barreling, as appropriate.

[Method for Non-Destructive Inspection]

Figure 3:
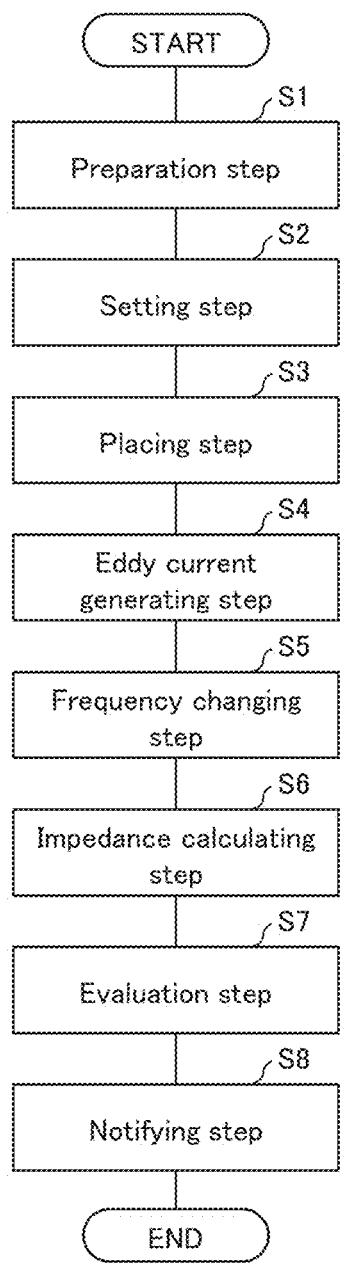
FIG. 3 is a flowchart illustrating a method for non-destructive inspection of steel in accordance with Embodiment 1.

The following description will discuss, with reference to the flowchart shown in FIG. 3, a method for non-destructive inspection of steel, which is carried out by the non-destructive inspection apparatus 1 in accordance with Embodiment 1. Note that the flowchart shown in FIG. 3 is an example, and the method is not limited to the order shown in the flowchart.

In the method for non-destructive inspection of steel in accordance with Embodiment 1, first, a preparation step (S1) involving preparing steel, which is an object under inspection M, and preparing the foregoing non-destructive inspection apparatus 1 is carried out. The steel, which is the object under inspection M, is intended to be, for example, steel for use in a component (such as gear wheel or gear) for automobiles, aircrafts, construction equipment, or the like or others such as springs, molds, or tools.

In Embodiment 1, steel which has been subjected to a carburizing and quenching treatment in the carburizing and quenching step (S13) and then subjected to a shot peening treatment in the shot peening step (S14) is used as the object under inspection M.

A material for the steel, which is the object under inspection M, is, for example, a chromium-molybdenum steel (JIS standard: SCM420). The shape of the steel, which is the object under inspection M, is a cylindrical shape obtained by machining the steel into the cylindrical shape in the machining step (S12).

Figure 5:
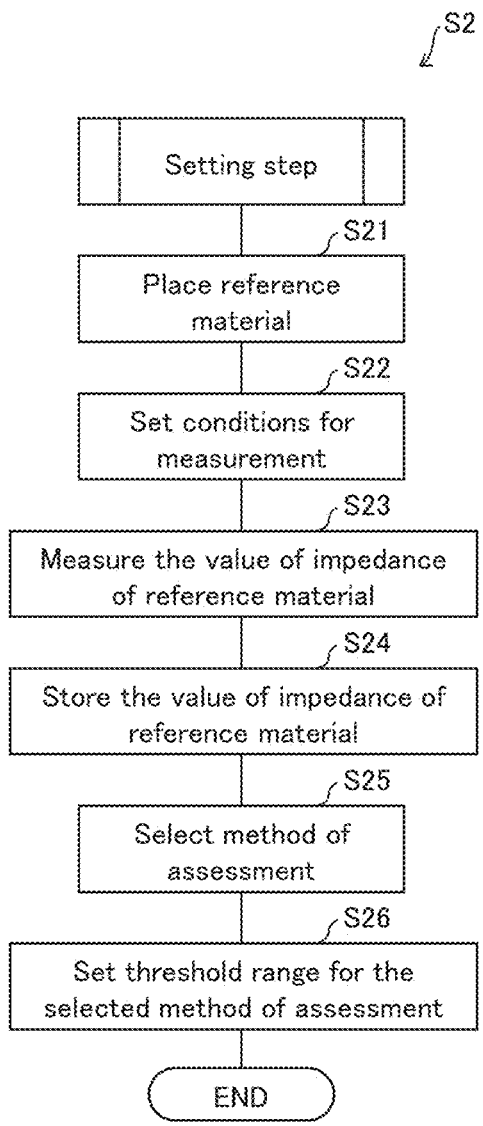
FIG. 5 is a flowchart illustrating a flow of a setting step in accordance with Embodiment 1.

Next, after the preparation step (S1), a setting step (S2) is carried out. In the setting step (S2), several steps are carried out in the order shown in the flowchart of FIG. 5. Note that the flowchart shown in FIG. 5 is an example, and this does not imply any limitation.

First, steel having not been subjected to a surface treatment (such steel is "reference material") is placed in a predetermined position in the non-destructive inspection apparatus 1 (S21). Specifically, the reference material is placed at the center of a circular cross section of the coil 21 within the coil 21 in the cylindrical shape, and brought into conditions in which an AC magnetic field induced by the coil 21 is capable of penetrating into the steel having not been subjected to a surface treatment.

Next, conditions for measurement, such as the position in which the reference material is placed and the range of the frequency of AC magnetic field passed through the coil 21, are set (S22). In this step, conditions for measurement under which evaluation of the state of the surface treatment of the object under inspection M can be appropriately carried out are set in consideration of the relationship between the foregoing parameters and magnetic permeability.

Then, the AC magnetic field is allowed to penetrate into the reference material and the frequency of alternating current is continuously changed by the variable frequency circuit 12, thereby continuously changing the penetration depth of the AC magnetic field in the reference material. During this process, the value $Z_0$ of impedance at each penetration depth in the reference material is measured (S23), and the measured value $Z_0$ of impedance at each penetration depth in the reference material is stored in a database (not illustrated) (S24).

Note that the database may have pre-stored therein data relating to the values $Z_0$ of impedance of reference materials subjected to various surface treatments, such as, for example, a shot peening treatment, a quenching treatment, a nitriding treatment, a carburizing treatment, a tempering treatment, an annealing treatment, a surface fabrication treatment, a polishing treatment, and/or a tempering treatment.

Next, a method of assessment for use in an evaluation step (S7) (described later) is selected (S25). There are the following three options for the method of assessment: (1) assessment based on area, (2) assessment based on peak, and (3) assessment based on integral, which will be described later. One method of assessment is selected from the three methods of assessment.

Next, at least one piece of steel which has been subjected to a surface treatment in a good manner (non-defective material) is subjected to the same steps as S21 to S24. The impedance value $Z_1$ of the non-defective material is measured in this manner, and data relating to this impedance value $Z_1$ is stored in the database. Furthermore, the impedance ratio $\gamma_1$ ($Z_1/Z_0$), i.e., the ratio between the impedance value $Z_0$ at each penetration depth in the reference material and the impedance value $Z_1$ at a corresponding penetration depth in the non-defective material, is calculated, and this impedance ratio $\gamma_1$ is stored in the database.

Next, on the basis of the calculated impedance ratio $\gamma_1$ of the non-defective material, a threshold range for use in the method of assessment selected in S25 is set (S26). By appropriately setting the type of method of assessment and the threshold range, it is possible to adjust the accuracy of evaluation of the state of the surface treatment of the object under inspection M. With this, the setting step (S2) ends. Note that a placing step (S3) to an evaluation step (S7) (which are described later) are preferably carried out immediately after the setting step (S2). This is because this makes it possible to reduce the influence of disturbance factors such as surrounding temperature, and thus possible to improve the accuracy of the evaluation.

Next, the process returns to FIG. 3, and the placing step (S3) involving placing the steel, which is the object under inspection M, is carried out. Specifically, the steel, which is the object under inspection M, is placed at the center of a circular cross section of the coil 21 within the coil 21 in the cylindrical shape, and brought into conditions in which an AC magnetic field induced by the coil 21 is capable of penetrating into the object under inspection M. Note that a method for placing the member is not limited as such, provided that the AC magnetic field in the coil 21 penetrates into the object under inspection M. The object under inspection M may alternatively be placed so as to face the coil 21.

After the placing step (S3), an eddy current generating step (S4) involving generating eddy current in the object under inspection M is carried out. Specifically, the control section 37 operates the alternating current source 11 via the variable frequency circuit 12. When the alternating current source 11 operates, an AC magnetic field is induced in the coil 21 (see FIG. 2). Eddy current is generated in the object under inspection M by allowing the AC magnetic field to penetrate into the object under inspection M.

Next, a frequency changing step (S5) involving continuously changing the penetration depth of the AC magnetic field in the object under inspection M is carried out. Specifically, the control section 37 outputs a control signal to the variable frequency circuit 12, thereby continuously changing the frequency of alternating current outputted from the alternating current source 11. With this, the penetration depth of the AC magnetic field in the object under inspection M continuously changes. In this case, the penetration depth of the AC magnetic field in the object under inspection M differs depending on the makeup of the interior portion of the object under inspection M even if the same AC magnetic field is applied to the object under inspection M.

Note that, in Embodiment 1, the quality of the surface condition of the object under inspection M was examined while changing the penetration depth of the AC magnetic field in the object under inspection M from 0 μm to 150 μm (see (a) of FIG. 7 and FIG. 8).

After the frequency changing step (S5), an impedance calculating step (S6) involving calculating the value $Z_2$ of the impedance at each penetration depth in the object under inspection M is carried out. Specifically, the control section 37 calculates the value $Z_2$ of the impedance on the basis of the potential difference between the opposite ends (point A and point B in FIG. 1) of the coil 21 and the value of electric current passing through the coil 21.

Figure 6:
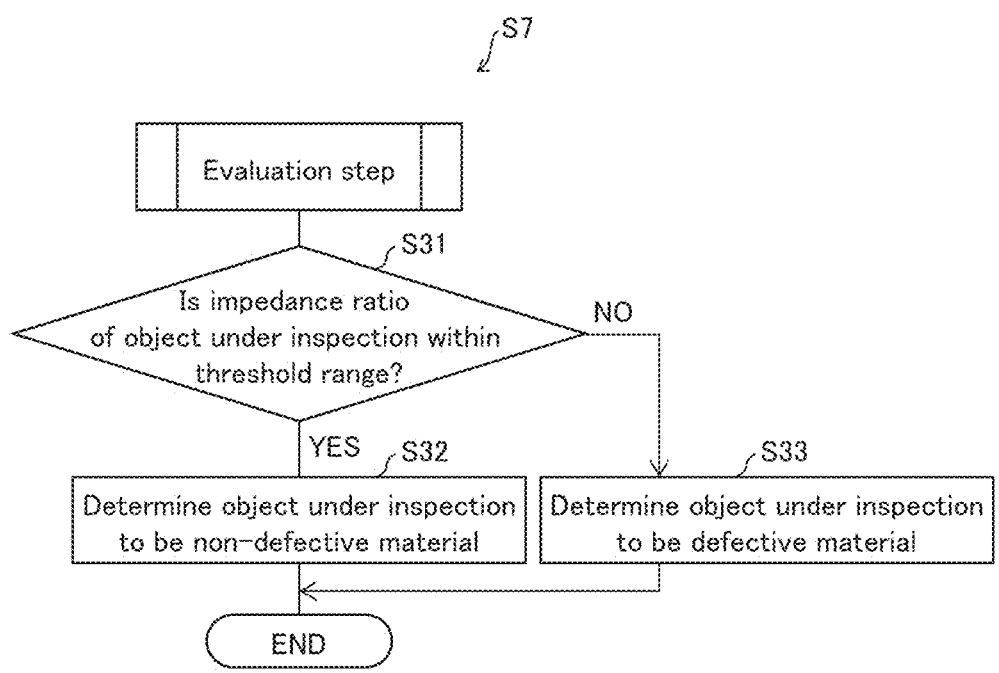
FIG. 6 is a flowchart illustrating a flow of an evaluation step in accordance with Embodiment 1.

Next, the evaluation step (S7) involving examining the quality of the surface condition of the object under inspection M is carried out. Specifically, several steps are carried out in the order shown in the flowchart of FIG. 6. Note that the flowchart shown in FIG. 6 is an example, and does not imply any limitation.

In Embodiment 1, assessment based on area, which is one of the foregoing three methods of assessment, is used. First, the control section 37 calculates an impedance ratio $\gamma_2$ ($Z_2/Z_0$), which is the ratio between the value $Z_2$ of the impedance at each penetration depth in the object under inspection M calculated in the impedance calculating step (S6) and the value $Z_0$ of the impedance at a corresponding penetration depth in the steel having not been subjected to a surface treatment (such steel is "reference material") measured in the setting step (S2). Then, whether the calculated impedance ratio $\gamma_2$ of the object under inspection M is within the threshold range or not is determined (S31). It is noted here that, with regard to the threshold range, the data set in the setting step (S2) is used.

In a case where the impedance ratio $\gamma_2$ of the object under inspection M is within the threshold range (YES in S31), the control section 37 determines the object under inspection M to be a non-defective material (S32). On the contrary, in a case where the impedance ratio $\gamma_2$ of the object under inspection M is outside the threshold range (NO in S31), the control section 37 determines the object under inspection M to be a defective material (S33).

Next, after the evaluation step (S7), a notifying step (S8) involving providing a notification indicative of whether the object under inspection M is a non-defective material or a defective material is carried out. In this notifying step (S8), the display device 38 displays whether the object under inspection M is a non-defective material or not.

In Embodiment 1, in the notifying step (S8), the display device 38 displays a chart in which the penetration depth is plotted on the horizontal axis and the impedance ratio $\gamma_2$ of the object under inspection M is plotted on the vertical axis, as shown in (a) of FIG. 7 and FIG. 8. The display device 38 also displays the results of assessment of the quality, as shown in (b) of FIG. 7.

In the example shown in (b) of FIG. 7, the following results of assessment are displayed: the number of objects under inspection M measured is seven, six of the seven objects under inspection M were determined to be non-defective materials, and one of the seven objects under inspection M was determined to be a defective material. The number of set points indicates that the impedance ratio $\gamma_2$ was calculated at 151 penetration depths between 0 μm and 150 μm.

FIG. 8 is a chart showing the manner in which the magnetic permeability of steel subjected to a surface treatment changes. When steel is subjected to a carburizing and quenching treatment in the carburizing and quenching step (S13), the carbon content in the surface of the steel increases. As the carbon content of the steel increases, magnetic permeability decreases. Due to such an influence of the carburization, after the carburizing and quenching treatment, the impedance ratio $\gamma_2$ of the object under inspection M has decreased as compared to that before the carburizing and quenching treatment (see circles in FIG. 8).

On the other hand, when the steel is subjected to a shot peening treatment in the shot peening step (S14), the surface of the steel is modified and thereby the magnetic permeability of the steel increases. Due to such an influence of the shot peening (SP), after the shot peening treatment, the impedance ratio $\gamma_2$ of the object under inspection M has increased as compared to that before the shot peening treatment (see squares in FIG. 8).

When the degree of shot peening (SP) is increased, e.g., the particle size of the shot material projected to the surface of the steel in shot peening is increased, the magnetic permeability of the surface of the steel becomes even greater due to the influence of SP (see lozenges in FIG. 8).

With use of changes in magnetic permeability resulting from the carburizing and quenching treatment and shot peening treatment, in the evaluation step (S7) of Embodiment 1, it is possible to determine whether the defect occurred in the carburizing step (S13) or the shot peening step (S14).

For example, in a case where the magnetic permeability of the object under inspection M has been determined to be greater than that of the non-defective material, the carbon content of the object under inspection M is small and a defect is determined to have occurred in the carburizing and quenching step (S13). On the other hand, in a case where the magnetic permeability of the object under inspection M has been determined to be less than that of the non-defective material, it is determined that a defect occurred in the shot peening step (S14) and the magnetic permeability was not increased to a sufficient extent.

With the foregoing method for non-destructive inspection of steel in accordance with Embodiment 1, the non-destructive inspection apparatus 1 generates eddy current in an object under inspection M and then continuously changes the penetration depth of AC magnetic field in the object under inspection M, thereby making it possible to calculate an impedance ratio $\gamma_2$, which is the ratio between the value $Z_2$ of impedance at each penetration depth in the object under inspection M calculated in the impedance calculating step (S6) and the value $Z_0$ of impedance at a corresponding penetration depth in steel having not been subjected to a surface treatment (such steel is "reference material"). It is further possible, on the basis of the result of impedance ratio $\gamma_2$ calculation, to identify a cause of the change in the magnetic permeability of the object under inspection M and evaluate the state of the surface treatment of the object under inspection M with high accuracy.

For example, by comparing the impedance ratio $\gamma_1$ of a non-defective material and the impedance ratio $\gamma_2$ of a defective material, it is possible to carry out evaluation (quality assessment) on the state of the surface treatment of the object under inspection M with high accuracy. Furthermore, by focusing on the amount of carbon which is one of the causes of a change in magnetic permeability of the object under inspection M, it is possible to determine whether the defect occurred in the carburizing step (S13) or the shot peening step (S14).

Furthermore, with the method for non-destructive inspection of steel in accordance with Embodiment 1, evaluation can be carried out such that a method of assessment to be carried out in the evaluation step (S7) is selected from the following three methods: (1) assessment based on area, (2) assessment based on peak, and (3) assessment based on integral, in the setting step (2). This makes it possible to improve the accuracy of the evaluation of the state of the surface treatment. In a case where a defect is expected to occur in a wide range of penetration depths in the object under inspection M like Embodiment 1 (see (a) of FIG. 7), good evaluation can be achieved by using the assessment based on area.

Furthermore, by appropriately setting, in the setting step (S2), the threshold range for use in the evaluation step (S7), it is possible to adjust the accuracy of evaluation of the state of the surface treatment according to a user's need.

With the foregoing method for non-destructive inspection of steel, evaluation can be carried out in the evaluation step (S7) by a most appropriate method selected from the foregoing three methods of assessment (1) to (3), depending on the object under inspection M. This makes it possible to improve the accuracy of evaluation. For example, in a case where the difference between the impedance ratio $\gamma_1$ of a non-defective material and the impedance ratio $\gamma_2$ of a defective material is expected to occur over all the penetration depths in the object under inspection M, the evaluation of the state of the surface treatment can be carried out reliably by employing evaluation using the distribution of the ratio (assessment based on area) of (1).

[Variation 1]

The following description will discuss a method for non-destructive inspection of steel in accordance with Variation 1 of Embodiment 1, with reference to FIG. 9. Variation 1 differs from Embodiment 1 in that the steel having subjected to the carburizing and quenching step (S13) shown in FIG. 4 is used as a reference material.

FIG. 9 is a chart showing examples of the result of impedance ratio $\gamma_2$ calculation in accordance with Variation 1. FIG. 9 shows that the impedance ratio $\gamma_2$ of an object under inspection M calculated in the evaluation step (S7) changes with changes in the particle size of the shot material used in the shot peening step (S14). Specifically, as the particle size of the shot material is increased, the magnetic permeability of the object under inspection M increases and the impedance ratio $\gamma_2$ of the object under inspection M becomes greater over a wide penetration depth range. In contrast, as the particle size of the shot material is reduced, the magnetic permeability of the object under inspection M decreases and the impedance ratio $\gamma_2$ of the object under inspection M becomes smaller over a wide penetration depth range.

As such, when steel having been subjected to the carburizing and quenching step (S13) is used as a reference material, it is possible to determine whether or not the shot peening step (S14) was carried out normally, with higher accuracy.

[Variation 2]

The following description will discuss a method for non-destructive inspection of steel in accordance with Variation 2 of Embodiment 1. In Variation 2, the size and shape of an object under inspection M are evaluated.

[Evaluation of Size and Shape]

In a case where the size and shape of an object under inspection M are evaluated, steel having a desired size and shape, not subjected to a surface treatment, is placed in the setting step (S2) shown in FIG. 5 (S21). In the following, the conditions for measurement are set (S22), the impedance of steel having not been subjected to a surface treatment (such steel is "reference material") is measured (S23), and the impedance value $Z_0$ of the reference material is stored (S24), in the same manner as described in Embodiment 1. Next, one method of assessment is selected from the three methods of assessment: (1) assessment based on area; (2) assessment based on peak; and (3) assessment based on integral (S25).

Next, at least one steel which has a desired size and shape (non-defective material) is subjected to the same steps as the foregoing S21 to S24. With this, the impedance value $Z_1$ of the non-defective material is measured, and data relating to this impedance value $Z_1$ is stored in a database. Furthermore, the impedance ratio $\gamma_1$ ($Z_1/Z_0$), which is the ratio between the impedance value $Z_0$ at each penetration depth in the reference material and the impedance value $Z_1$ at a corresponding penetration depth in the non-defective material, is calculated, and this impedance ratio $\gamma_1$ is stored in the database. Next, the threshold range for use in the method of assessment selected in S25 is set on the basis of the calculated impedance ratio $\gamma_1$ of the non-defective material (S26).

Then, the steps S3 to S6 in FIG. 3 are carried out in the same manner as described in Embodiment 1, thereby making it possible to evaluate the size and shape of the object under inspection M in the evaluation step S7. With this, it is possible, when the size and shape of the object under inspection M do not satisfy desired conditions, to determine the object under inspection M to be a defective material.

[Variation 3]

The following description will discuss a method for non-destructive inspection of steel in accordance with Variation 3 of Embodiment 1. In Variation 3, the hardness of an object under inspection M is evaluated.

[Evaluation of Hardness]

In a case where the hardness of an object under inspection M is evaluated, steel having not been subjected to a surface treatment (such steel is "reference material") is placed in the setting step (S2) shown in FIG. 5 (S21). In the following, the conditions for measurement are set (S22), the impedance value $Z_0$ of the reference material is measured (S23), and the impedance value $Z_0$ of the reference material is stored (S24), in the same manner as described in Embodiment 1. Next, one method of assessment is selected from the three methods of assessment: (1) assessment based on area; (2) assessment based on peak; and (3) assessment based on integral (S25).

Next, at least one steel which has a desired hardness (non-defective material) is subjected to the same steps as the foregoing S21 to S24. With this, the impedance value $Z_1$ of the non-defective material is measured, and data relating to this impedance value $Z_1$ is stored in a database. Furthermore, the impedance ratio $\gamma_1$ ($Z_1/Z_0$), which is the ratio between the impedance value $Z_0$ at each penetration depth in the reference material and the impedance value $Z_1$ at a corresponding penetration depth in the non-defective material, is calculated, and this impedance ratio $\gamma_1$ is stored in the database. Next, the threshold range for use in the method of assessment selected in S25 is set on the basis of the calculated impedance ratio $\gamma_1$ of the non-defective material (S26).

Then, the steps S3 to S6 in FIG. 3 are carried out in the same manner as described in Embodiment 1, thereby making it possible to evaluate the hardness of the object under inspection M in the evaluation step (S7). With this, it is possible, when the hardness of the object under inspection M does not satisfy a desired condition, to determine the object under inspection M to be a defective material.

Embodiment 2

The following description will discuss a method for non-destructive inspection of steel in accordance with Embodiment 2, with reference to FIG. 10 and (a) and (b) of FIG. 11. Note that, for convenience of description, members having functions identical to those described in Embodiment 1 are assigned identical referential numerals and their descriptions are omitted as appropriate. In the method for non-destructive inspection of steel in accordance with Embodiment 2, assessment based on peak is used as a method of assessment in an evaluation step.

As shown in FIG. 10, in an evaluation step (S7a) in accordance with Embodiment 2, the control section 37 determines whether or not the value of the impedance ratio $\gamma_2$ of an object under inspection M at a specific penetration depth is within the threshold range (S41). Specifically, evaluation (quality assessment in Embodiment 2) of the object under inspection M is carried out only with respect to a part (part enclosed by line in (a) of FIG. 11) of penetration depths at which the value of the impedance ratio $\gamma_2$ of the object under inspection M peaks.

In a case where the value of the impedance ratio $\gamma_2$ of the object under inspection M is within the threshold range (YES in S41), the control section 37 determines the object under inspection M to be a non-defective material (S42). On the contrary, in a case where the value of the impedance ratio $\gamma_2$ of the object under inspection M is outside the threshold range (NO in S41), the control section 37 determines the object under inspection M to be a defective material (S43).

In Embodiment 2, in the notifying step (S8), the display device 38 displays the results of the quality assessment as illustrated in (b) of FIG. 11. In the example shown in (b) of FIG. 11, the following results of assessment are displayed: the number of objects under inspection M measured is seven, six of the seven objects under inspection M were determined to be non-defective materials, and one of the seven objects under inspection M was determined to be a defective material. The display also indicates that the evaluation was carried out only with respect to the range in which the penetration depth is 10 µm to 30 µm in the assessment based on peak.

The method for non-destructive inspection of steel in accordance with Embodiment 2, as has been discussed, also makes it possible to evaluate the state of a surface treatment of the object under inspection M with high accuracy, as with the case of Embodiment 1. In particular, assessment based on peak is used to carry out the evaluation step (S7a) in Embodiment 2, and therefore it is possible to carry out evaluation with higher accuracy in a case where the difference between the impedance ratio $\gamma_1$ of a non-defective material and the impedance ratio $\gamma_2$ of a defective material is expected to be noticeable in the part where the impedance ratio $\gamma_2$ peaks (at specific penetration depth(s)).

Embodiment 3

The following description will discuss a method for non-destructive inspection of steel in accordance with Embodiment 3, with reference to FIG. 12 and (a) and (b) of FIG. 13. Note that, for convenience of description, members having functions identical to those described in Embodiment 1 are assigned identical referential numerals and their descriptions are omitted as appropriate. In the method for non-destructive inspection in accordance with Embodiment 3, assessment based on integral is used in an evaluation step.

In an evaluation step (S7b) in accordance with Embodiment 3, as shown in FIG. 12, evaluation (quality assessment) of the state of a surface treatment of an object under inspection M is carried out. The control section 37 determines whether or not the integral of the impedance ratio $\gamma_2$ of the object under inspection M in a specific penetration depth range (see the area filled with black in (a) of FIG. 13) is within a threshold range (S51). In a case where the integral of the impedance ratio $\gamma_2$ of the object under inspection M in the specific penetration depth range is within the threshold range (YES in S51), the control section 37 determines the object under inspection M to be a non-defective material (S52). On the contrary, in a case where the integral of the impedance ratio $\gamma_2$ of the object under inspection M in the specific penetration depth range is outside the threshold range (NO in S51), the control section 37 determines the object under inspection M to be a defective material (S53)

In Embodiment 3, in the notifying step (S8), the display device 38 displays the results of the quality assessment as illustrated in (b) of FIG. 13. The display example shown in (b) of FIG. 13 indicates that evaluation was carried out by calculating the integral in a penetration depth range of 10 µm to 30 µm in the assessment based on integral.

The method for non-destructive inspection of steel in accordance with Embodiment 3, as has been discussed, also makes it possible to evaluate the state of the surface treatment of the object under inspection M with high accuracy, as with the case of Embodiment 1. In particular, assessment based on area is used to carry out the evaluation step (S7b) in Embodiment 3, and therefore it is possible, in a case where both the evaluation using the assessment based on area and the evaluation using assessment based on peak are difficult to carry out, to identify a slight difference between the impedance ratio $\gamma_1$ of a non-defective material and the impedance ratio $\gamma_2$ of a defective material by carrying out evaluation using the integral of the impedance ratio $\gamma_2$ in a specific penetration depth range.

Other Embodiments

In the foregoing embodiments, a method most appropriate as the method of assessment for use in the evaluation step (S7) is selected from the three methods of assessment ((1) assessment based on area, (2) assessment based on peak, and (3) assessment based on integral) in the setting step (S2) and evaluation is carried out; however, this does not imply any limitation. For example, two of the three methods of assessment (1) to (3) may be used or all the three methods of assessment (1) to (3) may be used. Alternatively, evaluation may be carried out by appropriately changing the method of assessment as the penetration depth changes.

In the foregoing embodiments, steel having been subjected to a shot peening treatment as a surface treatment is used as an object under inspection M; however, this does not imply any limitation. Steel having been subjected to some other surface treatment such as a quenching treatment, a nitriding treatment, a carburizing treatment, a tempering treatment, an annealing treatment, a surface fabrication treatment, a polishing treatment, or a tempering treatment can be used as an object under inspection M. Also in such cases, by storing the impedance ratio $\gamma_1$, which is the ratio between the impedance value $Z_0$ of the reference material and the impedance value $Z_1$ of a non-defective material, in a database and appropriately setting a threshold range for use in evaluation in the setting step S2, it is possible to evaluate the state of the surface treatment of the object under inspection M with high accuracy.

It is also possible to evaluate the arrangement of atoms (phase transformation) in the object under inspection M, the magnitude of plastic strain in the object under inspection M, and the magnitude and direction of elastic strain in the object under inspection M, as the state of surface treatment(s) of the object under inspection M.

Specifically, steel which was subjected to a carburizing and quenching treatment in the carburizing and quenching step (S13) contains retained austenite. When this is subjected to a shot peening treatment, this undergoes phase transformation into martensite and the amount of the retained austenite decreases. As the amount of martensite increases, the magnetic permeability of the steel increases. Using such a relationship, it is possible to evaluate, as the state of a surface treatment of the object under inspection M, the phase transformation of the object under inspection M.

Furthermore, steel which was subjected to a shot peening treatment in the shot peening step (S14) changes in magnetic permeability as the magnitude of plastic strain changes. Using such a relationship, it is also possible to evaluate the magnitude of plastic strain in the object under inspection M.

Furthermore, steel which was subjected to a shot peening treatment in the shot peening step (S14) changes in magnetic permeability as the magnitude and direction of elastic strain change. Using such a relationship, it is also possible to evaluate the magnitude and direction of elastic strain in the object under inspection M.

The relationship in magnitude among the foregoing causes of a change in magnetic permeability is as follows: "phase transformation of object under inspection M>plastic strain in object under inspection M>magnitude and direction of elastic strain in object under inspection M". By pre-storing such a relationship in a database, it is also possible to evaluate the state of a surface treatment of the object under inspection M and determine in which step a defect occurred.

The present invention is not limited to the foregoing embodiments, but can be altered within the scope of the claims. The present invention also encompasses, in its technical scope, any embodiment derived by combining technical means disclosed in differing embodiments.

Aspects of the present invention can also be expressed as follows.

A method for non-destructive inspection of steel in accordance with an aspect of the present invention includes a preparation step, a placing step, an eddy current generating step, a frequency changing step, an impedance calculating step, and an evaluation step.

The preparation step involves preparing a non-destructive inspection apparatus which includes a variable frequency circuit and a coil. The variable frequency circuit is capable of changing the frequency of alternating current. The coil is capable of inducing an AC magnetic field in response to alternating current.

The placing step involves placing an object under inspection so that the AC magnetic field induced by the coil penetrates into the object under inspection. The object under inspection is steel which has been subjected to one or more surface treatments.

The eddy current generating step involves generating eddy current in the object under inspection by allowing the AC magnetic field to penetrate into the object under inspection.

The frequency changing step involves continuously changing the penetration depth of the AC magnetic field in the object under inspection by causing the variable frequency circuit to continuously change the frequency of the alternating current from a low frequency to a high frequency.

The impedance calculating step involves calculating the value of impedance at each penetration depth in the object under inspection on the basis of the potential difference between opposite ends of the coil and the value of electric current passing through the coil.

Then, the evaluation step involves evaluating the state of the one or more surface treatments of the object under inspection by (a) calculating the ratio between the value of impedance at each penetration depth in the object under inspection calculated in the impedance calculating step and the value of impedance at a corresponding penetration depth in steel which has not been subjected to the one or more surface treatments and (b) identifying one or more causes of a change in magnetic permeability of the object under inspection on the basis of the ratio thus calculated. The one or more causes of the change in magnetic permeability include, for example, the carbon content or nitrogen content of the object under inspection, the size and shape of the object under inspection, the hardness of the object under inspection, and the like.

In the above method for non-destructive inspection of steel, the non-destructive inspection apparatus generates eddy current in the object under inspection and then the penetration depth of the AC magnetic field in the object under inspection is continuously changed, thereby making it possible to calculate the ratio (impedance ratio) between the value of impedance at each penetration depth in the object under inspection calculated in the impedance calculating step and the value of impedance at a corresponding penetration depth in steel which has not been subjected to the surface treatment. Then, it is possible to evaluate the state of the surface treatment(s) of the object under inspection by identifying cause(s) of a change in magnetic permeability of the object under inspection on the basis of the ratio thus calculated.

For example, in a case where steel which has been subjected to a carburizing and quenching step and then a shot peening step is the object under inspection and where the magnetic permeability of the object under inspection has been determined to be greater than that of the non-defective material, the carbon content of the object under inspection is small and a defect is determined to have occurred in the carburizing and quenching step. On the other hand, in a case where the magnetic permeability of the object under inspection has been determined to be less than that of the non-defective material, it is determined that the defect occurred in the shot peening step and the magnetic permeability was not increased to a sufficient extent. In this way, it is possible to evaluate the state of the surface treatment(s) of the object under inspection with high accuracy.

A method for non-destructive inspection of steel in accordance with an aspect of the present invention is configured such that the one or more causes of the change in magnetic permeability include a carbon content of the object under inspection, a magnitude and direction of elastic strain in the object under inspection, a magnitude of plastic strain in the object under inspection, and/or an arrangement of atoms in the object under inspection.

In the above method for non-destructive inspection of steel, for example, the amount of carbon (carbon content) in the object under inspection is evaluated as a cause of a change in magnetic permeability, and thereby, with use of the difference in magnetic permeability between defective and non-defective materials resulting from the amounts of carbon, it is possible to determine that a defect occurred in, for example, the carburizing and quenching step. As such, it is possible to evaluate the object under inspection with higher accuracy. Note that the amount of carbon in the object under inspection may be evaluated by calculating the carbon content of the object under inspection on the basis of the ratio. The amount of carbon in the object under inspection may be evaluated on the basis of the correlation between the ratio and the amount of carbon in the object under inspection.

A method for non-destructive inspection of steel in accordance with an aspect of the present invention is configured such that the one or more surface treatments at least include a shot peening treatment, a quenching treatment, a nitriding treatment, a carburizing treatment, a tempering treatment, an annealing treatment, a surface fabrication treatment, a polishing treatment, or a tempering treatment.

The above method for non-destructive inspection of steel makes it possible to determine whether or not at least the shot peening treatment, the quenching treatment, the nitriding treatment, the carburizing treatment, the tempering treatment, the annealing treatment, the surface fabrication treatment, the polishing treatment, or the tempering treatment has been carried out normally.

A method for non-destructive inspection of steel in accordance with an aspect of the present invention is configured such that, in the evaluation step, the state of the one or more surface treatments of the object under inspection is evaluated by carrying out at least one of the following methods of assessment: (1) assessment of whether or not a distribution of the ratio is within a threshold range; (2) assessment of whether or not the ratio at a specific penetration depth is within a threshold range; and (3) assessment of whether or not an integral of the ratio in a specific penetration depth range is within a threshold range.

The above method for non-destructive inspection of steel makes it possible, in the evaluation step, to carry out evaluation using the most appropriate method selected from the above three methods for assessment (1) to (3) according to the object under inspection, and thus possible to improve the accuracy of evaluation. For example, in a case where the difference in impedance ratio between non-defective and defective materials is expected to occur in a wide range of penetration depths in the object under inspection M, it is preferable to carry out evaluation using the distribution of the ratio indicated in (1). In a case where the difference in impedance ratio between non-defective and defective materials is expected to appear notably in a specific part of the penetration depths, it is preferable to carry out evaluation using the ratio at a specific penetration depth(s) indicated in (2). In a case where the evaluation using the method of assessment (1) and the evaluation using the method of assessment (2) are both difficult, evaluation using the integral of the ratio in a specific penetration depth range makes it possible to identify a slight difference in ratio.

A method for non-destructive inspection of steel in accordance with an aspect of the present invention includes a setting step which is carried out before the placing step, the setting step including selecting the at least one method of assessment which is to be carried out in the evaluation step and setting the threshold range(s) for use in the selected at least one method of assessment.

In the above method for non-destructive inspection of steel, the threshold range for use in the evaluation step is appropriately set in the setting step, thereby making it possible to adjust the accuracy of evaluation according to a user's need.

A method for non-destructive inspection of steel in accordance with an aspect of the present invention is configured such that, in the evaluation step, a size and shape of the object under inspection are evaluated as the state of the one or more surface treatments.

The above method for non-destructive inspection of steel makes it possible to evaluate whether or not the object under inspection has a desired size and shape.

A method for non-destructive inspection of steel in accordance with an aspect of the present invention is configured such that, in the evaluation step, a hardness of the object under inspection is evaluated as the state of the one or more surface treatments.

The above method for non-destructive inspection of steel makes it possible to evaluate whether or not the object under inspection has a desired hardness.

REFERENCE SIGNS LIST 1 non-destructive inspection apparatus
11 alternating current source
12 variable frequency circuit
21 coil
37 control section
38 display device
M object under inspection
S1 preparation step
S2 setting step
S3 placing step
S4 eddy current generating step
S5 frequency changing step
S6 impedance calculating step
S7, S7a, S7b evaluation step
S8 notifying step

The invention claimed is:

1. A method for non-destructive inspection of steel, the method comprising:
   a preparation step comprising preparing a non-destructive inspection apparatus that includes (i) a variable frequency circuit that is capable of changing a frequency of alternating current and (ii) a coil that is capable of inducing an AC magnetic field in response to the alternating current;
   a placing step comprising placing an object under inspection so that the AC magnetic field induced by the coil penetrates into the object under inspection, the object under inspection being the steel which has been subjected to one or more surface treatments, the one or more surface treatments including a carburizing treatment and a shot peening treatment;
   an eddy current generating step comprising generating eddy current in the object under inspection by allowing the AC magnetic field to penetrate into the object under inspection;
   a frequency changing step comprising continuously changing a penetration depth of the AC magnetic field in the object under inspection by causing the variable frequency circuit to continuously change the frequency of the alternating current from a low frequency to a high frequency;

an impedance calculating step comprising calculating a value of impedance at each penetration depth in the object under inspection on the basis of a potential difference between opposite ends of the coil and a value of electric current passing through the coil; and an evaluation step comprising evaluating a state of the one or more surface treatments of the object under inspection by (a) calculating a ratio between the value of impedance at each penetration depth in the object under inspection calculated in the impedance calculating step and a value of impedance at a corresponding penetration depth in the steel which has not been subjected to the one or more surface treatments and (b) identifying as one or more causes of a change in magnetic permeability of the object under inspection, in which a defect occurred in the carburizing treatment and the shot peening treatment, on the basis of the ratio thus calculated, wherein in the evaluation step, the state of the one or more surface treatments of the object under inspection is evaluated by carrying out a method of assessment as follow:

in a case where a difference in the ratio between non-defective and defective materials is expected to occur in a wide range of the penetration depth in the object under inspection, a method of assessment (1) of whether or not a distribution of the ratio is within a threshold range is carried out;

in a case where the difference in the ratio between non-defective and defective materials is expected to appear notably in a specific part of the penetration depth, a method of assessment (2) of whether or not the ratio at a specific penetration depth is within a threshold range is carried out; and in a case where evaluation using the method of assessment (1) and evaluation using the method of assessment (2) are both difficult, a method of assessment (3) of whether or not an integral of the ratio in a specific penetration, depth range is within a threshold range is carried out, and in the evaluation step, in a case where the magnetic permeability of the object under inspection has been determined to be greater than that of a non-defective material which is the steel having been subjected to the one or more surface treatments, it is determined that a defect occurred in the carburizing treatment, and in a case where the magnetic permeability of the object under inspection has been determined to be less than that of the non-defective material, it is determined that a defect occurred in the shot peening treatment.

2. The method as set forth in claim 1, wherein the one or more causes of the change in magnetic permeability include at least one of a carbon content of the object under inspection, a magnitude and direction of elastic strain in the object under inspection, a magnitude of plastic strain in the object under inspection, or an arrangement of atoms in the object under inspection.

3. The method as set forth in claim 1, wherein the one or more surface treatments further include a quenching treatment, a nitriding treatment, a tempering treatment, an annealing treatment, a surface fabrication treatment, a polishing treatment, or a tempering treatment.

4. The method as set forth in claim 1, wherein, in the evaluation step, the state of the one or more surface treatments of the object under inspection is evaluated by carrying out at least one of the following methods of assessment: (1) assessment of whether or not a distribution of the ratio is within a threshold range; (2) assessment of whether or not the ratio at a specific penetration depth is within a threshold range; and (3) assessment of whether or not an integral of the ratio in a specific penetration depth range is within a threshold range.

5. The method as set forth in claim 4, comprising a setting step which is carried out before the placing step, the setting step comprising selecting the at least one method of assessment which is to be carried out in the evaluation step and setting the threshold range(s) for use in the selected at least one method of assessment.

6. The method as set forth in claim 1, wherein, in the evaluation step, a size and shape of the object under inspection are evaluated as the state of the one or more surface treatments.

7. The method as set forth in claim 1, wherein, in the evaluation step, a hardness of the object under inspection is evaluated as the state of the one or more surface treatments.

* * * * *